United States Patent
Leikas

(10) Patent No.: US 11,087,455 B2
(45) Date of Patent: Aug. 10, 2021

(54) MACHINE VISION SYSTEM

(71) Applicant: Oy Mapvision Ltd., Helsinki (FI)

(72) Inventor: Esa Leikas, Espoo (FI)

(73) Assignee: Oy Mapvision Ltd, Helsinki (FI)

( * ) Notice: Subject to any disclaimer, the term of this patent is extended or adjusted under 35 U.S.C. 154(b) by 0 days.

(21) Appl. No.: 16/500,491

(22) PCT Filed: Jan. 11, 2018

(86) PCT No.: PCT/FI2018/050016
§ 371 (c)(1),
(2) Date: Oct. 3, 2019

(87) PCT Pub. No.: WO2018/185363
PCT Pub. Date: Oct. 11, 2018

(65) Prior Publication Data
US 2021/0004944 A1    Jan. 7, 2021

(30) Foreign Application Priority Data

Apr. 5, 2017 (FI) .................... 20175318

(51) Int. Cl.
| | | |
|---|---|---|
| *G06K 9/00* | (2006.01) | |
| *G06T 7/00* | (2017.01) | |
| *G06T 7/70* | (2017.01) | |
| *G01B 11/00* | (2006.01) | |
| *G01B 11/24* | (2006.01) | |

(52) U.S. Cl.
CPC ............ *G06T 7/001* (2013.01); *G01B 11/005* (2013.01); *G01B 11/24* (2013.01); *G06T 7/70* (2017.01); *G06T 2207/30108* (2013.01)

(58) Field of Classification Search
None
See application file for complete search history.

(56) References Cited

U.S. PATENT DOCUMENTS

| 4,991,304 A | 2/1991 | McMurtry |
|---|---|---|
| 5,426,861 A | 6/1995 | Shelton |
| (Continued) | | |

FOREIGN PATENT DOCUMENTS

| CN | 10427100 A | 5/2009 |
|---|---|---|
| CN | 103424083 A | 12/2013 |
| (Continued) | | |

OTHER PUBLICATIONS

English language Abstract of DE102016114337.
(Continued)

*Primary Examiner* — Hadi Akhavannik
(74) *Attorney, Agent, or Firm* — Ware, Fressola, Maguire & Barber LLP

(57) ABSTRACT

A machine vision system capable of measuring differences on an absolute scale is disclosed. In the machine vision system, a reference object is accurately measured using a reference measurement arrangement, such as a coordinate measurement machine. In the measurement, a set of determined virtual points are measured. The reference measurement is used for computing a deviation matrix between a determined coordinate matrix and the reference measurement results that is later used for computing absolute scale values from machine vision measurements.

13 Claims, 2 Drawing Sheets

```
Determining three-dimensional          200
virtual points

|
            v

Measuring the virtual points with       201
a coordinate measurement machine

|
            v

Determining a deviation                 202
matrix
```

(56) References Cited

U.S. PATENT DOCUMENTS

| | | | |
|---|---|---|---|
| 6,526,166 B1 | | 2/2003 | Gorman |
| 6,853,332 B1* | | 2/2005 | Brookes ............... G01C 5/005 |
| | | | 342/191 |
| 7,440,931 B1* | | 10/2008 | Suzuki .................. G09B 7/00 |
| | | | 706/46 |
| 8,520,926 B2* | | 8/2013 | Schilling ................ G06T 7/33 |
| | | | 382/131 |
| 2003/0038933 A1 | | 2/2003 | Shirley et al. |
| 2004/0150557 A1* | | 8/2004 | Ford ................... G01C 21/165 |
| | | | 342/357.32 |
| 2005/0259882 A1* | | 11/2005 | Dewaele ................ G06T 7/75 |
| | | | 382/243 |
| 2008/0204656 A1* | | 8/2008 | Fujita ..................... A61B 3/14 |
| | | | 351/206 |
| 2009/0198446 A1* | | 8/2009 | Hursan ................... G01V 3/32 |
| | | | 702/11 |
| 2010/0166294 A1 | | 7/2010 | Marrion et al. |
| 2011/0044504 A1* | | 2/2011 | Oi ........................... G06T 7/73 |
| | | | 382/103 |
| 2011/0069892 A1 | | 3/2011 | Tsai et al. |
| 2014/0314276 A1 | | 10/2014 | Wexler et al. |
| 2016/0379351 A1 | | 12/2016 | Michael et al. |
| 2020/0088521 A1* | | 3/2020 | Glevarec ............... G01C 21/16 |

FOREIGN PATENT DOCUMENTS

| | | | |
|---|---|---|---|
| CN | 103955939 A | | 7/2014 |
| CN | 103983186 A | | 8/2014 |
| CN | 104034269 A | | 9/2014 |
| CN | 104780865 A | | 7/2015 |
| DE | 102016114337 A1 | | 2/2017 |
| EP | 3040941 A1 | | 7/2016 |
| JP | 2006308500 A | | 11/2006 |
| JP | 2013019704 A | | 1/2013 |
| JP | 2017116297 A | | 6/2017 |

OTHER PUBLICATIONS

Shen, T.-S. et al, Multiple-Sensor Integration for Rapid and High-Precision Coordinate Metrology. In: Advanced Intelligent Mechatronics, 1999, IEEE, Sep. 19, 1999, pp. 908-915, ISBN 0-7803-5038-3, <DOI; 10.1109/AIM, 1999.803293> Chapter B.1. Camera Calibration.

EPO Communication Pursuant to Rule 114(2) EPC; issued in EP patent application 18700940.2 dated May 26, 2020.

Oy Mapvision Ltd., "Machine Vision System"; publication No. EP3607264; date of publication Dec. 2, 2020; whole document.

English language Abstract of JP2006308500.

English language Abstract of JP2013019704.

English language Abstract of JP2017116297.

Henrik G.A. Haggren; "Photogrammetric stations for robot vision"; Proceedings of SPIE; vol. 1615, Mar. 1, 1992; pp. 227-234.

English translation of CN103983186A.

English Abstract of CN101427100A.

English translation of CN103424083A.

English translation of CN103955939A.

English translation of CN104034269A.

English Abstract of CN104780865A.

* cited by examiner

MACHINE VISION SYSTEM

DESCRIPTION OF BACKGROUND

The following disclosure relates to machine vision systems. Particularly, the application relates to measuring machine vision systems that are used in quality control or in other similar tasks that require measuring an object.

Computer controlled machine vision systems are used in various applications. One typical application is quality control of manufactured objects in manufacturing industry. It is possible to measure various properties of an object by imaging the manufactured object using one or more cameras. The measurement may involve measuring a whole object or some selected features of the object. Thus, the measurement may be one-, two- or three-dimensional or may even be performed in a combination of dimensions depending on the selected features. In addition to the size and shape, it is also possible to measure other characteristics, such as color, roughness or other such features. The measurements of a machine vision system are typically made by comparing the manufactured object with a model object. The results achieved typically give a relative difference of the measured object and the model object used.

To measure a three-dimensional coordinate, only two cameras are required as a three-dimensional coordinate can be computed from two two-dimensional images, provided that the measured point is visible in both images. However, typically the number of cameras is larger. This is because a larger number of cameras increases the coverage and accuracy of the measurement. The cameras are typically located so that they can see all features of the measured object, or at least as many of the features as possible. Correspondingly, it is common that a measured feature is not seen by all of the cameras. In addition to increasing the number of cameras, a plurality of other concepts, such as precise calibration and image processing algorithms, are known to improve the measurement accuracy. Furthermore, it is possible to plan the camera locations for particular objects or use more accurate cameras or specific lighting to improve the quality of images acquired from desired features.

Measuring machine vision systems are particularly good in that they recognize measured features similarly under different conditions. Thus, when an object is measured, features such as edges and holes will be detected similarly, even if the conditions change. Because of this, it is possible to accurately measure even small changes in the location or the shape of the object. Although the measurement results derived from the acquired images are precise, they cannot be compared with measurement results measured with other measurement tools, such as a coordinate measurement machine. This is because it is difficult to measure, for example, the absolute location of an edge by using conventional machine vision systems and methods. Although it is possible to accurately measure the relative change of size, location or other changes of the measured object, it is difficult to measure the same change on an absolute scale instead of the relative difference.

In conventional solutions, these measurements are sometimes supplemented by accurately measuring the location of the measured object or by placing the measured object in a measurement jig so that the accurate location is known. When the location is exactly known, it is possible to measure at least some of the absolute measures of the object to be measured. One method is to make a reference object ("golden object") that is manufactured as accurately as possible to meet the nominal dimensions of the object.

These approaches, however, may be problematic if there is a need for measuring different types of objects or a large number of objects. The measurements will be slow if the measured object needs to be accurately positioned before the measurement can be done. Correspondingly, if there is a need to measure different types of objects, there may also be a need for different types of jigs or other positioning means that may need to be changed between the measurements. All these mechanical methods are expensive and subject to wear and tear.

SUMMARY

A machine vision system capable of measuring differences on an absolute scale is disclosed. In the machine vision system, a reference object is accurately measured using a reference measurement arrangement, such as a coordinate measurement machine. In the measurement, a set of points determined by drawings or CAD data are measured. The reference measurement is used for computing a deviation matrix between a determined coordinate matrix and the reference measurement results that is later used for computing absolute scale values from machine vision measurements.

In an aspect, a controller for a machine vision system is disclosed. The controller comprises at least one processor, at least one memory and at least one data communication connection. The controller is configured to receive a deviation matrix, wherein the deviation matrix is based on a measurement of a reference object using a reference measurement device. The processor is configured to measure, using a machine vision system, the reference object and at least one target object, compute a difference matrix representing the difference between a target object and the reference object and compute the absolute scale result for at least one target object based of a measured target object, the respective difference matrix and the deviation matrix.

In an embodiment, the controller is further configured to receive a determined coordinate matrix, wherein the determined coordinate matrix comprises coordinates of at least one virtual point. In a further embodiment, the controller is further configured to receive a determined coordinate matrix. In another embodiment, the processor is configured to compute the absolute scale result of at least one target object as a sum of the deviation matrix, difference matrix and determined coordinate matrix.

In another aspect, a machine vision system is disclosed. The machine vision system comprises a controller as described above and at least two cameras connected to the controller. In an embodiment, the machine vision system further comprises a coordinate measurement machine.

In an aspect, a method for measuring an object is disclosed. The method for measuring an object comprises measuring, using a machine vision system, a reference object and at least one target object; computing a difference matrix representing the difference between a target object and the reference object; and computing the absolute scale result for at least one target object based of a measured target object, the respective difference matrix and the deviation matrix.

In an embodiment, the method further comprises receiving a deviation matrix, wherein the deviation matrix is based on a measurement of a reference object using a reference measurement device. In another embodiment, the method further comprises receiving a determined coordinate matrix, wherein the determined coordinate matrix comprises coordinates of at least one virtual point. In a further embodiment, the method further comprises receiving a determined coordinate matrix. In an embodiment, the method further comprises computing the absolute scale result of at least one target object as a sum of the deviation matrix, difference matrix and determined coordinate matrix.

In an aspect, the method described above is implemented as a computer program. The computer program comprises computer program code, wherein the computer program code is configured to perform a method as described above when executed by a computing device.

The benefits of the described embodiments include a possibility to use absolute measurements using a machine vision system. When absolute measurements are needed, the arrangement and method disclosed provide a fast and cost-efficient method of performing absolute measurements, as not all of the measured objects need to be measured using a coordinate measurement machine.

BRIEF DESCRIPTION OF THE DRAWINGS

The accompanying drawings, which are included to provide a further understanding of the machine vision system and constitute a part of this specification, illustrate embodiments and together with the description help to explain the principles of the machine vision system. In the drawings.

DETAILED DESCRIPTION

Reference will now be made in detail to the embodiments, examples of which are illustrated in the accompanying drawings.

Figure 1:
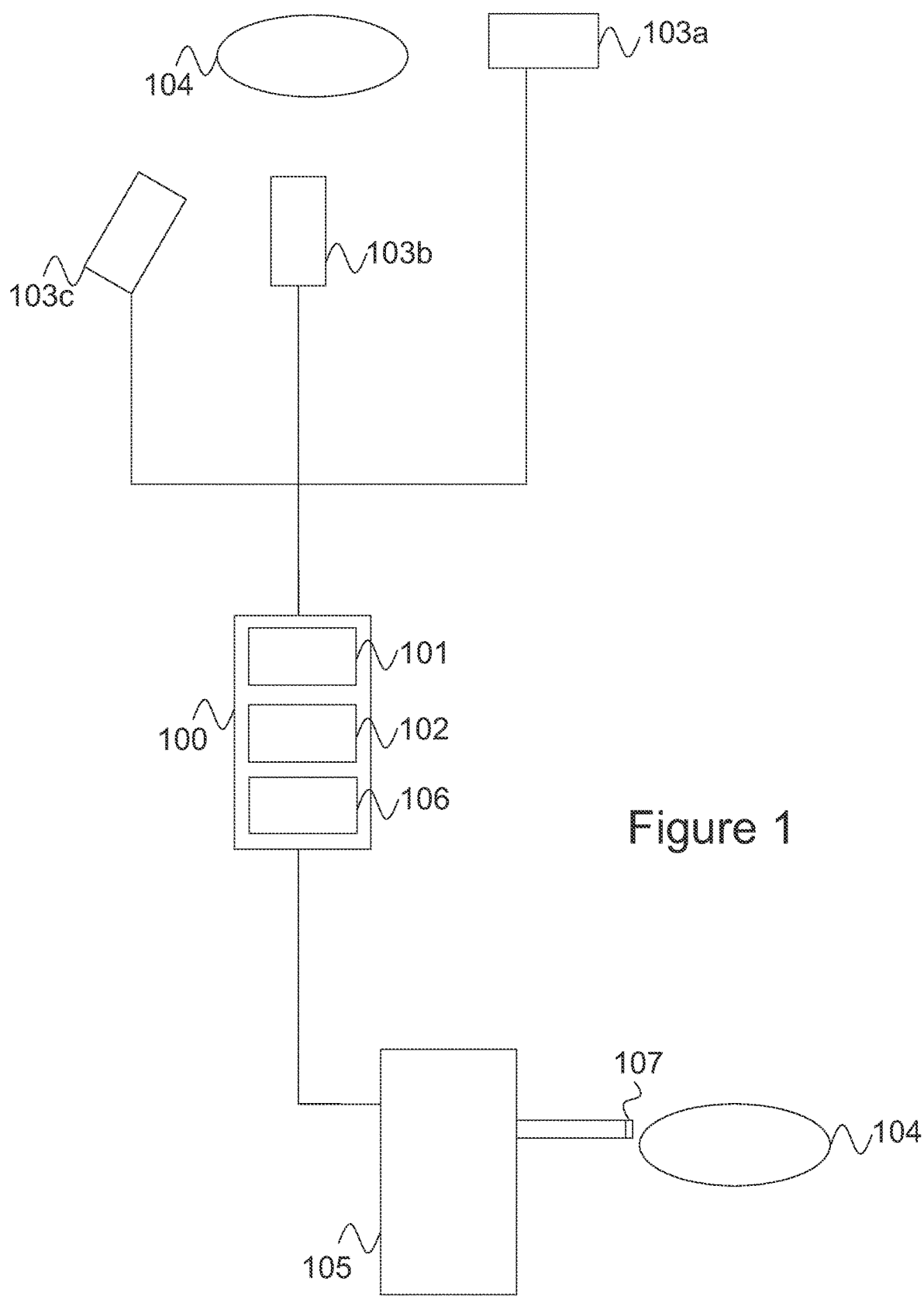
FIG. 1 is an example of a machine vision system.

In FIG. 1, a block diagram illustrating an example of a controller 100 for a machine vision system is shown. The controller 100 comprises at least one processor 101 and at least one memory 102. The at least one processor 101 is configured to execute computer programs and the at least one memory is configured to store computer programs comprising computer program code and the data needed by the computer programs. Typically, the controller is a general purpose computer, but it may also be a specially manufactured controller. The controller 100 comprises several connectors so that the controller 100 may be connected to external devices and data communication networks using a data communication connection 106. Furthermore, it is possible to include typical computing devices, such as displays, keyboards and other commonly known devices.

The controller 100 is configured to control a machine vision system. The machine vision system comprises a plurality of cameras 103a-103c. The processor of the controller is configured to acquire images of an object to be measured 104 using a camera 103a-103c. Even if the figure illustrates the use of three cameras, the number of cameras will not be limited to three, and typically a higher number of cameras will be used.

The controller 100 controlling the machine vision system of the figure is further configured to receive measurement results from an external measurement device, such as a coordinate measurement machine 105. The coordinate measurement machine 105 comprises a probe 106 that is used in measuring the object 104. In the following description, the use of the coordinate measurement machine will be explained in more detail; however, the object 104 in FIG. 1 should be understood to be the one and the same object. Thus, it will be first measured by using the machine vision arrangement and then using the coordinate measurement machine, or vice versa. In other words, the object is not assumed to be under two measurements at the same time, but the results of the two measurements are stored in the memory 102 of the controller 100.

The object 104 needs not to be a particularly manufactured model object. The object 104 may be an ordinary production or pre-production manufactured object. Thus, a benefit of the arrangement is that there is no need for specifically and more accurately manufactured model objects. In the example of FIG. 1, the coordinate measurement machine 105 is coupled with the controller 100. This, however, is not necessary. The coordinate measurement machine needs not to be located in the same premises and does not need to be directly connected with the controller 100. However, it is required that the measurement results achieved with the coordinate measurement machine 105 can be brought to the controller 100. If there is no direct connection, the measurement results may be brought using a media carrier, such as a memory stick, memory card, optical disk, traditional magnetic diskette or the like. Correspondingly, the controller 100 is connected to additional computers using a local area network connection. The local area network connection may be used for controlling and configuring the controller 100 and for ordinary data exchange. For example, the local area network connection may be used for receiving data related to the objects to be measured.

Figure 2:
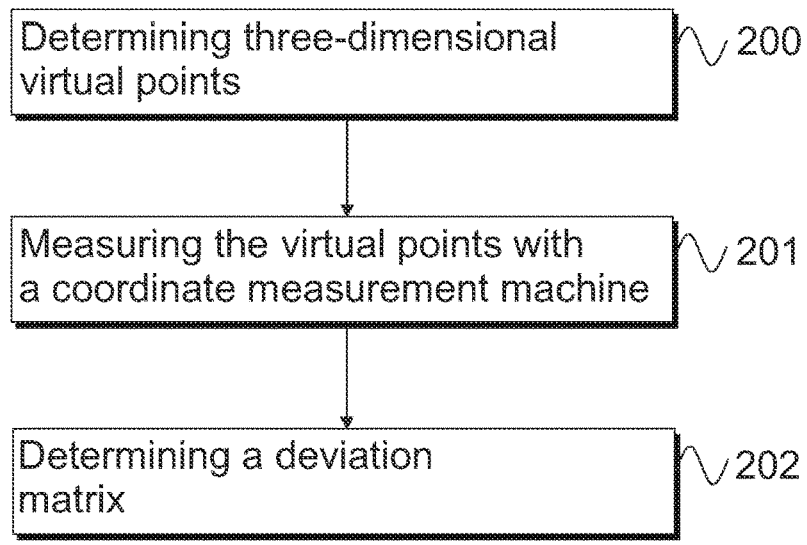
FIG. 2 is an example of a method of a machine vision system.

In FIG. 2, an example method for performing an initial measurement is shown. In the method, three-dimensional virtual points are used. As explained above, different cameras see the measured object in a different location. Thus, the point measured by the camera system is not the real accurate location of the measured point, but represents the point as it is seen by the camera system that comprises at least two cameras. This so called virtual point deviates from the real coordinates of the measured object. However, if the measured object moves, the three-dimensional virtual points and the deviation will move accordingly. If the measured object does not move and different parts of the object are measured, the movements of the virtual points will correspond with the changes of the measured object. These may be caused, for example, by thermal expansion. If the measured object is changed to a similar object, the changes of the three-dimensional virtual points will correspond with the changes between the measured objects.

The virtual points can be chosen freely; however, the coordinate values are typically chosen to correspond with the features to be measured. A virtual three-dimensional point $(X,Y,Z)$ corresponds with virtual two-dimensional $(x_0, y_0, x_1, y_1, \ldots x_n, y_n)$ coordinate pairs that can be seen using cameras, where n is the number of cameras. To determine the location of the virtual points, conventional methods may be used for searching and detecting the points to be measured.

The method of FIG. 2 is initiated by determining the three-dimensional virtual points, step 200. The determination will be carried out by using a reference object. Virtual points are 3-D points that are bound to the features to be measured of the reference part. A virtual 3-D point is normally, but not definitely, close to a point like the center point of a hole. The reference object may be a particular model object or just any manufactured object. The determined three-dimensional virtual points form a determined coordinate matrix N, the matrix size being m×3, wherein m is the number of three-dimensional virtual points. It is also possible to use several reference parts and calculate a matrix E in equation (1) so that it comprises average values.

After determining the three-dimensional virtual points, the corresponding points are measured from the reference object using a coordinate measurement machine or other reference measurement device, step 201. From the measurements, a result matrix $M_0$ is formed. Lastly, a deviation matrix E is determined, step 202. The deviation matrix is determined according to equation (1)

$$E = M_0 - N \qquad \text{equation (1)}$$

The method of FIG. 2 may be considered as a part of the calibration process of the machine vision system; however, it may also be interpreted as an initial measurement for the measurement method described below with regard to FIG. 3. It should be noted that even a reference measurement system cannot measure certain features like hole center points directly, since a hole center point is not a physical object. The hole center point location has to be determined indirectly by measuring the hole edges and assuming, for instance, that the hole has an accurate circular shape.

Figure 3:
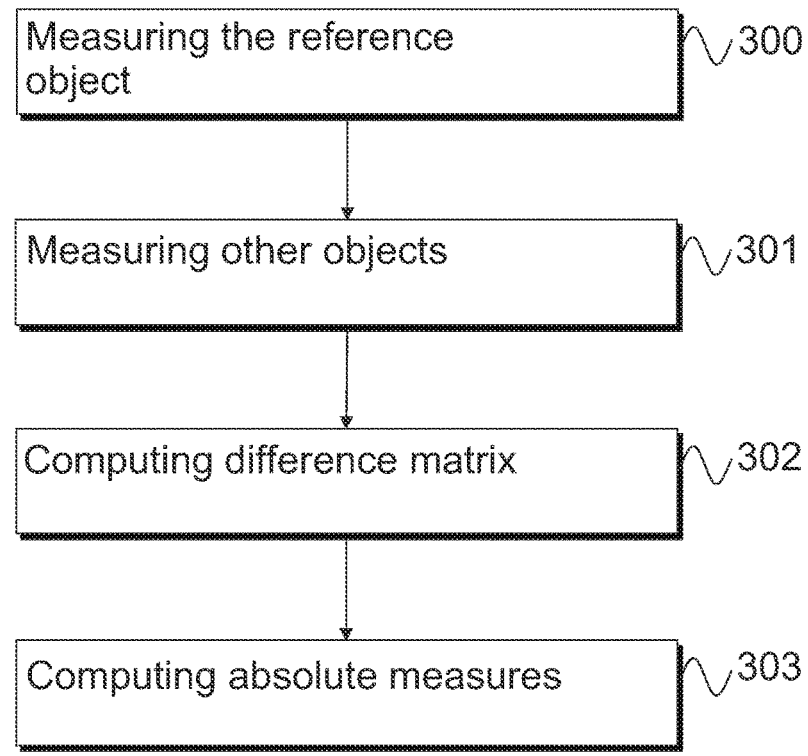
FIG. 3 is an example of a method of a machine vision system.

In FIG. 3, an example method for measuring objects is shown. The measurement procedure uses determined three-dimensional virtual points. The method is initiated by measuring, using a camera system, the reference object that was measured using the reference measurement device, step 300. The measurement provides a result matrix $V_0$. This step is also possible to implement into the method discussed above with regard to FIG. 2. As it is not dependent of the rest of the method of FIG. 2, it can be executed at any stage.

After the reference object has been measured, the other objects can be measured, step 301. For each object a result matrix $V_n$ is obtained. The result matrix $V_n$ is a common result in the machine vision measurements. The obtained result matrices and the result matrix of the reference object are adapted to each other, for example by using a least squares method, so that a difference matrix $D_n$ between the measured object and the reference object can be computed according to equation 2, step 302.

$$D_n = V_n - V_0 \qquad \text{equation (2)}$$

After computing the difference matrix $D_n$, it is possible to compute a matrix $M_n$ representing the absolute scale measures of the measured object n by using equation 3, step 303.

$$M_n = D_n E + N \qquad \text{equation (3)}$$

The achieved result matrix $M_n$ is comparable with the absolute scale results given by the reference measurement device, such as a coordinate measurement machine. In the above description, the measured objects may be called target objects and the reference may be one of the target objects; however, it may also be a particular reference object. Depending on the situation we can also calculate more directly $$D_n = V_n - N \qquad \text{equation (4) giving}$$

$$M_n = V_n + E \qquad \text{equation (5)}$$

The above-mentioned method may be implemented as computer software comprising computer program code, which is executed in a computing device able to communicate with external devices. When the software is executed in a computing device it is configured to perform the above described inventive method. The software is embodied on a computer readable medium so that it can be provided to the computing device, such as the controller 100 of FIG. 1.

As stated above, the components of the exemplary embodiments can include a computer readable medium or memories for holding instructions programmed according to the teachings of the present inventions and for holding data structures, tables, records, and/or other data described herein. The computer readable medium can include any suitable medium that participates in providing instructions to a processor for execution. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, a RAM, a PROM, an EPROM, a FLASH-EPROM, any other suitable memory chip or cartridge, a carrier wave or any other suitable medium from which a computer can read.

It is obvious to a person skilled in the art that with the advancement of technology, the basic idea of the machine vision system may be implemented in various ways. The machine vision system and its embodiments are thus not limited to the examples described above; instead they may vary within the scope of the claims.

The invention claimed is:

1. A machine vision system for a machine vision system comprising:
   at least two cameras (103a-103c); and
   a controller (100), wherein the controller further comprises:
      at least one processor (101);
      at least one memory (102); and
      at least one data communication connection (106);
   wherein the controller (100) is configured to receive a deviation matrix, wherein the deviation matrix is based on a measurement of a reference object using a reference measurement device; and
   wherein the at least one processor (101) is configured to:
      measure the reference object and at least one target object;
      compute a difference matrix representing the difference between the at least one target object and the reference object; and
      compute an absolute scale result for the at least one target object based of a measured target object, a respective difference matrix and the deviation matrix.

2. A machine vision system according to claim 1, wherein the controller (100) is further configured to receive a determined coordinate matrix, wherein the determined coordinate matrix comprises coordinates of at least one virtual point.

3. A machine vision system according to claim 1, wherein the controller (100) is further configured to receive a determined coordinate matrix.

4. A machine vision system according to claim 3, wherein the processor (101) is configured to compute the absolute scale result of the at least one target object as a sum of the deviation matrix, the difference matrix and the determined coordinate matrix.

5. A machine vision system according to claim 1, wherein the machine vision system further comprises a coordinate measurement machine (106).

6. A method for measuring an object comprising:
   receiving a deviation matrix (303);
   measuring, using a machine vision system, a reference object and at least one target object (300, 301);

computing a difference matrix representing the difference between the at least one target object and the reference object (302);

computing an absolute scale result for the at least one target object based on a measured target object, a respective difference matrix and the deviation matrix (303), wherein the deviation matrix is based on a measurement of the reference object using a reference measurement device.

7. A method according to claim 6, wherein the method further comprises receiving a determined coordinate matrix, wherein the determined coordinate matrix comprises coordinates of at least one virtual point.

8. A method according to claim 6, wherein the method further comprises receiving a determined coordinate matrix.

9. A method according to claim 8, wherein the method further comprises computing the absolute scale result of the at least one target object as a sum of the deviation matrix, the difference matrix and the determined coordinate matrix.

10. A non-transitory computer readable medium, comprising computer program code, wherein the computer program code is configured to perform a method according to claim 6, when executed by a computing device.

11. A non-transitory computer readable medium, comprising computer program code, wherein the computer program code is configured to perform a method according to claim 7, when executed by a computing device.

12. A non-transitory computer readable medium, comprising computer program code, wherein the computer program code is configured to perform a method according to claim 8, when executed by a computing device.

13. A non-transitory computer readable medium, comprising computer program code, wherein the computer program code is configured to perform a method according to claim 9, when executed by a computing device.

\* \* \* \* \*